United States Patent [19]

Axelsson et al.

[11] 4,352,140

[45] Sep. 28, 1982

[54] SURGE ARRESTER

[75] Inventors: Bror Axelsson, Västervik; Ulf Johnsen, Ludvika; Lennart Stenström; Bengt Thors, both of Ludvika, all of Sweden

[73] Assignee: Asea Aktiebolag, Vasteras, Sweden

[21] Appl. No.: 257,262

[22] Filed: Apr. 24, 1981

[30] Foreign Application Priority Data

May 5, 1980 [SE] Sweden ............................... 8003329

[51] Int. Cl.[3] ............................................. H02H 3/22

[52] U.S. Cl. ..................................... 361/127; 361/117

[58] Field of Search ............... 361/117, 127, 130, 131; 338/21

[56] References Cited

U.S. PATENT DOCUMENTS 4,046,847 9/1977 Kresge .............................. 338/21 X 4,100,588 7/1978 Kresge ................................ 361/127

FOREIGN PATENT DOCUMENTS 548350 1/1923 France ................................ 361/130

*Primary Examiner*—Harry E. Moose, Jr.

*Attorney, Agent, or Firm*—Watson, Cole et al.

[57] ABSTRACT

In a surge arrester comprising a stack of series-connected cylindrical ZnO-varistors in an insulating housing, the envelope surface of each varistor is provided with an insulating protection means, which overlap varistors positioned adjacent to each other. The protection means prevent the varistors from being mechanically damaged during handling, provides guiding for the varistors in the stack, and seals the stack of varistors, so that a local glow discharge or a fault in individual varistors will not lead to an arc flash-over along the stack.

8 Claims, 4 Drawing Figures

SURGE ARRESTER

BACKGROUND OF THE INVENTION

1. Field of the Invention

The present invention relates to a surge arrester comprising an insulating housing containing a plurality of cylindrical varistor blocks arranged coaxially in a stack, the end surfaces of the varistor blocks being provided with electrodes for electrical series connection of the blocks in the stack, the envelope surfaces being tightly surrounded by annular protection members of the insulating material. The invention is preferably intended for surge arresters comprising zinc oxide varistors.

2. Prior art

Zinc oxide varistors are strongly non-linear varistors which consist of zinc oxide (exceeding 90%) and some other metal oxides which are mixed, shaped and sintered at a high temperature into cylindrical bodies, the envelope surface of which is provided with a thin, electrically insulating (preferably ceramic) coating and the end surfaces with electrodes of a suitable metal (see, e.g., U.S. Pat. No. 4,046,847). Because of the strong non-linearity of these varistors, they are extremely suitable for use in surge arresters, since in that case the spark gaps necessary in conventional surge arresters with silicon carbide varistors can be completely omitted, or alternatively, the number of spark gaps be heavily reduced. The surge arresters built up from zinc oxide varistors usually consist of a plurality of cylindrical varistor blocks stacked in series (possibly together with a small number of spark gaps) in porcelain housings which are hermetically sealed and provided with overpressure relief means in a known manner. The stack or stacks of varistors are usually arranged centrally in the porcelain housing with a free space between the stacks and the housing, so that an overpressure generated during a short-circuit in the surge arrester can be discharged through protective members at the ends of the surge arrester. For surge arresters having several stacks of varistors connected in parallel, electrically and mechanically, metallic guide plates may be used to accomplish the parallel connection and fix the stacks laterally, evenly spaced from each other.

Compared with silicon carbide varistors, zinc oxide varistors have a relatively level current-voltage characteristic. This means that a stack of zinc oxide varistors has a relatively high voltage stress in the longitudinal direction also at relatively small currents. In connection with a fault in a varistor block or bad contact between two adjacent blocks of varistors, glow discharge may arise and a small part of the total flash-over distance between the ends of the stack of varistors be ionized. There is then a certain risk of a total flash-over occurring in the porcelain housing, especially at overvoltage stresses of a long duration (several milliseconds), which particularly occur with applications for high voltage direct current and in connection with alternating voltage upon discharge of long lines or cables.

It is previously known to provide zinc oxide varistor blocks with a protection means for the envelope surface of, for example, silicon rubber (U.S. Pat. No. 4,100,588). Among other things, this protects the blocks from mechanical damage during transport and other handling, and further the heat emission capacity of the blocks is improved by bringing the rubber into contact with part of the internal periphery of the housing. However, this previously known protection means provides little protection against flash-over initiated by glow discharge caused by bad contact between adjacent blocks or a fault in an individual block.

SUMMARY OF THE INVENTION

The present invention relates to a surge arrester comprising an insulating housing containing a plurality of cylindrical varistor blocks arranged coaxially in a stack, the end surfaces of the varistor blocks being provided with electrodes for electrical series connection of the blocks in the stack, the envelope surfaces being tightly surrounded by annular protective members of insulating material. The purpose of the invention is to provide a surge arrester of the above-mentioned kind, in which a local ionization in the varistor stack caused, for example, by a fault in a block or by bad contact between two adjacent blocks, is prevented from spreading outside the stack. This is achieved by forming said protective members so as to overlap each other between varistor blocks positioned adjacent to each other .

By an envelope surface protection means according to the invention, the blocks will be protected during handling so that edge damage, and the like, is avoided, while at the same time efficient sealing of the stack of varistors is obtained so that a local ionization is prevented from spreading. In this way is can be prevented that, for example, a short-circuited block leads to breakdown of a surge arrester.

BRIEF DESCRIPTION OF THE DRAWING

The invention will be described in greater detail with reference to the accompanying drawings, in which.

DESCRIPTION OF THE PREFERRED EMBODIMENTS

Figure 1:
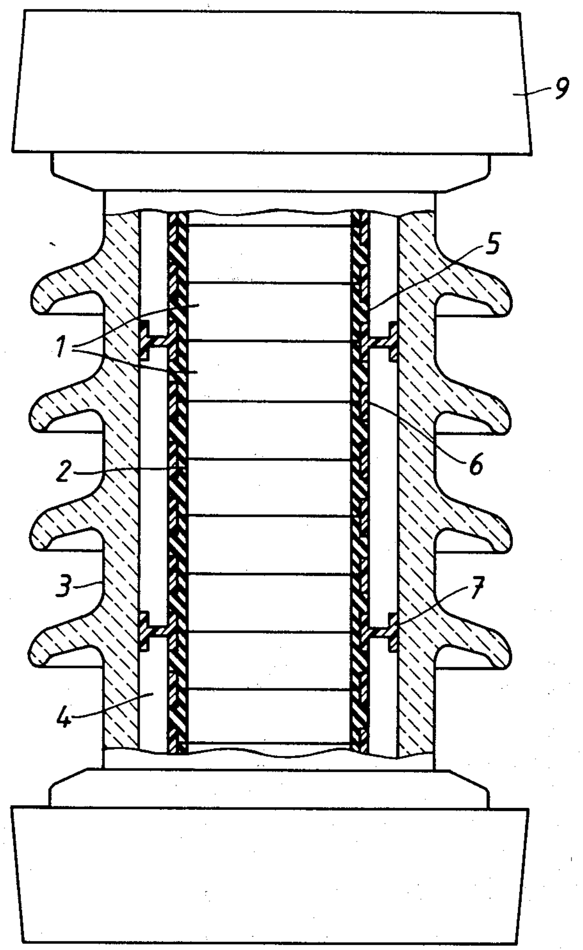
FIG. 1 shows an axial section through a surge arrester according to the invention.

The surge arrester shown in FIG. 1 comprises a plurality of cylindrical varistor blocks 1 arranged coaxially in a stack 2. The stack of varistors is arranged centrally in an elongated porcelain housing 3 so that an annular space 4 is formed between the stack and the housing. The varistor blocks consist substantially of zinc oxide. Their end surfaces are provided with electrodes in the form of a metallic coating, the varistor blocks in the stack thus being series-connected. Further, the blocks are provided with an electrically insulating envelope protection means consisting of protective rings 5, attached to the blocks, as well as guide rings 6. Two of the guide rings are each provided with three or four projections 7 distributed around the circumference, which projections support the stack against the housing but leave a free passage for gas communication between the ends of the surge arrester. The porcelain housing is provided with end fittings 8 and 9, which contain members for hermetic sealing of the housing, members for overpressure relief, and external terminals.

Figure 2:
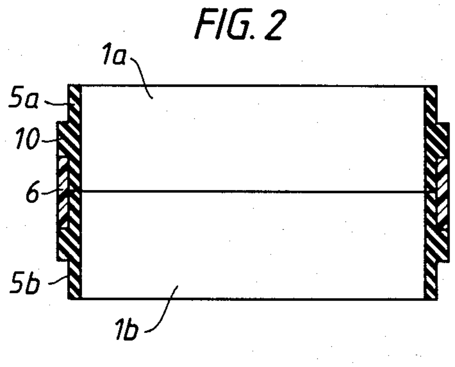
FIG. 2 shows an axial section through two series-connected varistor blocks of the surge arrester of FIG. 1 provided with protection means for the envelope surface according to a first embodiment of the invention.

FIG. 2 shows two of the series-connected varistor blocks 1*a*, 1*b*, shown in FIG. 1, on a larger scale, providing a clearer picture of the envelope surface protection means of the blocks. The envelope protection means consists partly of the protective rings 5 of insulating material, which have been cast onto the varistor blocks, and partly of separate insulating auxiliary rings (guide rings) 6. These auxiliary rings make it possible for the varistor blocks to be stacked on top of each other while being guided in the lateral direction. Simultaneously, they seal the varistor stack so that ionized gas which may be formed because of glow discharge between two adjacent blocks, or a fault in an individual block, is prevented from spreading outwards. The protective rings 5 have substantially the same axial extension as the varistor blocks and are provided with an external surrounding elevation 10 for fixing the guide rings 6 in axial direction.

Figure 3:
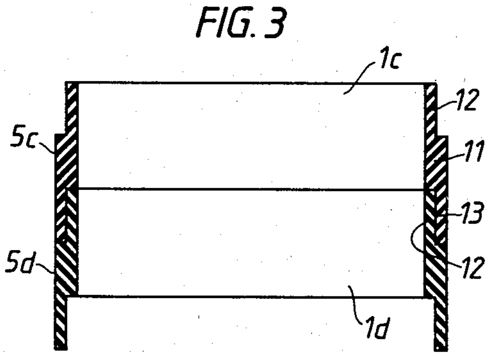
FIG. 3 shows in a corresponding manner two varistor blocks according to a second embodiment of the invention.

FIG. 3 shows two series-connected varistor blocks 1*c*, 1*d* with envelope surface protection means of an alternative design. Also this protection means consists of protective rings 5*c*, 5*d* of insulating material cast onto the varistor blocks. The protective rings are formed with a mid-portion 11 and two edge portions 12, 13 having a smaller thickness than the mid-portion. One edge portion 13 extends past the end surface of the associated varistor block and its inside diameter is so adapted to the outside diameter of the other edge portion 12 of the protective ring of the adjacent varistor block that the edge portion 13 of the protective ring 5*c* surrounds the edge portion 12 of the protective ring 5*d* with fit. In this embodiment of the protection means, the varistor blocks may be stacked directly on top of each other without any separate members for guiding in radial direction being required.

Figure 4:
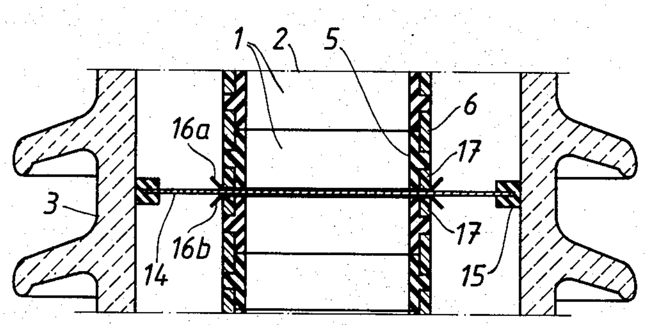
FIG. 4 shows an axial section through part of a surge arrester with a modified side supporting arrangement for the varistor blocks.

To support the stack 2 of varistors against the porcelain housing 3, the embodiment shown in FIG. 4 may be used instead of the guide rings with projections 7 shown in FIG. 1. The design shown in FIG. 4 comprises a metal plate 14 arranged in the varistor stack, said metal plate being supported at, for example, three places around the circumference, against the porcelain housing by means of dampers 15. Between the plate and the porcelain housing there is a gap for gas communication in the longitudinal direction of the surge arrester. The plate 14 is provided on both sides with guide members 16*a*, 16*b* for the stack of varistors. These guide members may, for example, consist of metallic rings or thin plates with a foldedup edge, fixed to the plate 14 by, for example, spot welding, or they may consist of embossments directly in the plate 14. Sealing of the stack at the plate 14 is achieved by the protective rings 5 making contact with the plate and being surrounded by support rings 17, which are of the same design as the guide rings 6 but only half as high as these. The same principle of sealing can be used where the varistor blocks are connected to metal plates at both ends of the porcelain housing.

As material in the protective rings there may be used, for example, curable silicon rubber with or without a filler. In surge arrester designs in which the highest transient temperature of the blocks is not too high, certain types of thermoplastic resins may also be used, for example a sulphonic polymer, such as polyether sulphon, or polyphenylene sulphide. The material in the guide rings 6 need not withstand as high a temperature as the internal protective rings 5 and may therefore possibly be made of a different plastic material which may suitably be somewhat stiffer than the material in the protective rings. The thickness of material of the protective rings 5 may be, for example, about 3 mm on the thinner end portions and about 5 mm on the thicker mid-portion, whereas the thickness of the guide rings 6 may be, for example, 2–4 mm. The most suitable thickness of the rings is, however, dependent on, among other things, the stiffness of the material and can therefore vary from case to case.

Instead of providing the varistor blocks with directly cast-on protective rings, the protective rings may also be manufactured separately and attached to the varistor blocks by being shrunk on or pulled on.

We claim:

1. A surge arrester comprising:
an insulating housing;
a plurality of cylindrical varistor blocks arranged coaxially in a stack in said housing, the end surfaces of said varistor blocks being provided with electrodes for electrical series connection of said blocks in said stack; and
annular protective members of insulating material tightly surrounding the envelope surfaces of said varistor blocks, said protective members being formed so as to overlap each other between varistor blocks positioned adjacent to each other.

2. Surge arrester according to claim 1, wherein each of said protective members comprises a protective ring fixed at the envelope surface of the respective varistor block, said protective ring having a larger axial extension than the varistor block.

3. Surge arrester according to claim 2, wherein the edge portion of said protective ring extends axially past the end surface of the associated varistor block and is arranged to surround, with fit, the other edge portion of the protective ring of the immediately adjacently positioned varistor block.

4. Surge arrester according to claim 1, wherein each of said protective members comprises a protective ring, fixed at the envelope surface of the respective varistor block and having substantially the same axial extension as the varistor block, as well as an insulating guide ring which surrounds the edge portions of the protective rings of adjacently positioned varistor blocks, each protective ring having an external surrounding elevation for fixing the guide rings.

5. Surge arrester according to claim 4, wherein said varistor stack comprises metallic guide plates oriented substantially perpendicularly to the longitudinal direction of the stack, said guide plates being provided with guide members for fixing the stack in lateral direction, the protective rings of varistor blocks adjacent said guide plates extending to the respective guide plate and being surrounded by support rings.

6. Surge arrester according to claim 1 or 4, wherein said varistor blocks substantially consist of zinc oxide.

7. Surge arrester according to claim 1 or 4, wherein said protective rings are made of silicon rubber with quartz filling.

8. Surge arrester according to claim 4, wherein said guide rings are made of a harder material than said protective rings.

* * * * *